US007231347B2

(12) United States Patent
Zakarauskas

(10) Patent No.: US 7,231,347 B2
(45) Date of Patent: *Jun. 12, 2007

(54) ACOUSTIC SIGNAL ENHANCEMENT SYSTEM

(75) Inventor: Pierre Zakarauskas, Vancouver (CA)

(73) Assignee: QNX Software Systems (Wavemakers), Inc. (CA)

( * ) Notice: Subject to any disclaimer, the term of this patent is extended or adjusted under 35 U.S.C. 154(b) by 17 days.

This patent is subject to a terminal disclaimer.

(21) Appl. No.: 11/136,829

(22) Filed: May 24, 2005

(65) Prior Publication Data

US 2005/0222842 A1 Oct. 6, 2005

Related U.S. Application Data

(63) Continuation of application No. 09/375,309, filed on Aug. 16, 1999, now Pat. No. 6,910,011.

(51) Int. Cl.
*G10L 15/20* (2006.01)

(52) U.S. Cl. ...................................... 704/233; 704/226

(58) Field of Classification Search ................ 704/201, 704/205, 226, 233
See application file for complete search history.

(56) References Cited

U.S. PATENT DOCUMENTS 4,628,156 A 12/1986 Irvin
4,843,562 A 6/1989 Kenyon et al.
5,027,410 A 6/1991 Williamson et al.
5,313,555 A 5/1994 Kamiya
5,502,688 A 3/1996 Recchione et al.
5,680,508 A 10/1997 Liu
5,933,801 A 8/1999 Fink et al.
5,949,888 A 9/1999 Gupta et al.
6,111,957 A 8/2000 Thomasson
6,167,375 A 12/2000 Miseki et al.
6,725,190 B1 4/2004 Chazan et al.
6,910,011 B1 * 6/2005 Zakarauskas ............... 704/233
2002/0176589 A1 11/2002 Buck et al.
2003/0093270 A1 5/2003 Domer (Continued)

FOREIGN PATENT DOCUMENTS

EP 0 629 996 A2 12/1994

(Continued)

OTHER PUBLICATIONS

Zakarauskas, Pierre, *Detection and Localization of Nondeterministic Transients in Time Series and Application to Ice-Cracking Sound*, Digital Signal Processing, Jan. 3, 1993, No. 1, Orlando, Florida.

(Continued)

*Primary Examiner*—Angela Armstrong
(74) *Attorney, Agent, or Firm*—Brinks Hofer Gilson & Lione

(57) ABSTRACT

A signal enhancement system improves the quality of a noisy input signal. The system finds a low noise signal model which best matches the noisy input signal. Noisy portions of the input signal are replaced with portions of the low noise signal models. As the input signal increases in noise content, the output signal includes an increasing amount of the low noise signal model. The system thereby produces an output signal with very low noise which corresponds to the input signal.

25 Claims, 4 Drawing Sheets

U.S. PATENT DOCUMENTS

| | | | |
|---|---|---|---|
| 2003/0216907 | A1 | 11/2003 | Thomas |
| 2004/0024600 | A1 | 2/2004 | Hamza et al. |
| 2004/0078200 | A1 | 4/2004 | Alves |
| 2004/0165736 | A1 | 8/2004 | Hetherington et al. |
| 2004/0167777 | A1 | 8/2004 | Hetherington et al. |
| 2005/0114128 | A1 | 5/2005 | Hetherington et al. |

FOREIGN PATENT DOCUMENTS

| | | |
|---|---|---|
| EP | 0 629 996 A3 | 12/1994 |
| EP | 0 750 291 A1 | 12/1996 |

OTHER PUBLICATIONS

Quelavoine, R. et al., *Transients Recognition in Underwater Acoustic with Multilayer Neural Networks*, pp. 330-332.

Learned, R., et al. *A Wavelet Packet Approach to Transient Signal Classification*, Applied and Computational Harmonic Analysis 2, 265-278 (1995).

Simon, G., *Detection of Harmonic Burst Signals*, Circuit Theory and Applications, vol. 13, pp. 195-201 (1985).

Quatieri, T. F. et al., *Noise Reduction Using a Soft-Decision Sine-Wave Vector Quantizer*, International Conference on Acoustics, Speech & Signal Processing, Apr. 3-6, 1990, pp. 821-824, vol. 2, $S_2$ VA, IEEE ICASSP 90, New Mexico, US, XP000146895.

* cited by examiner

Speech enhancement

Background noise estimation and transient isolation

Pattern matching routine

ACOUSTIC SIGNAL ENHANCEMENT SYSTEM

PRIORITY CLAIM

This application is a Continuation of, and claims the benefit of priority from, U.S. Ser. No. 09/375,309, filed Aug. 16, 1999, now U.S. Pat. No. 6,910,011 which is incorporated herein by reference.

BACKGROUND OF THE INVENTION

1. Technical Field

This invention relates to systems and methods for enhancing the quality of an acoustic signal degraded by additive noise.

2. Related Art

There are several fields of research studying acoustic signal enhancement, with the emphasis being on speech signals. Among those are: voice communication, automatic speech recognition (ASR), and hearing aids. Each field of research has adopted its own approaches to acoustic signal enhancement, with some overlap between them.

Acoustic signals are often degraded by the presence of noise. For example, in a busy office or a moving automobile, the performance of ASR systems degrades substantially. If voice is transmitted to a remote listener—as in a teleconferencing system—the presence of noise can be annoying or distracting to the listener, or even make the speech difficult to understand. People with a loss of hearing have notable difficulty understanding speech in noisy environment, and the overall gain applied to the signal by most current hearing aids does not help alleviate the problem. Old music recordings are often degraded by the presence of impulsive noise or hissing. Other examples of communication where acoustic signal degradation by noise occurs include telephony, radio communications, video-conferencing, and computer recordings.

Continuous speech large vocabulary ASR is particularly sensitive to noise interference, and the solution adopted by the industry so far has been the use of headset microphones. Noise reduction is obtained by the proximity of the microphone to the mouth of the subject (about one-half inch), and sometimes also by special proximity effect microphones. However, a user often finds it awkward to be tethered to a computer by the headset, and annoying to be wearing an obtrusive piece of equipment. The need to use a headset precludes impromptu human-machine interactions, and is a significant barrier to market penetration of ASR technology.

Apart from close-proximity microphones, traditional approaches to acoustic signal enhancement in communication have been adaptive filtering and spectral subtraction. In adaptive filtering, a second microphone samples the noise but not the signal. The noise is then subtracted from the signal. One problem with this approach is the cost of the second microphone, which needs to be placed at a different location from the one used to pick up the source of interest. Moreover, it is seldom possible to sample only the noise and not include the desired source signal. Another form of adaptive filtering applies bandpass digital filtering to the signal. The parameters of the filter are adapted so as to maximize the signal-to-noise ratio (SNR), with the noise spectrum averaged over long periods of time. This method has the disadvantage of leaving out the signal in the bands with low SNR.

In spectral subtraction, the spectrum of the noise is estimated during periods where the signal is absent, and then subtracted from the signal spectrum when the signal is present. However, this leads to the introduction of "musical noise" and other distortions that are unnatural. The origin of those problems is that, in regions of very low SNR, all that spectral subtraction can determine is that the signal is below a certain level. By being forced to make a choice of signal level based on sometimes poor evidence, a considerable departure from the true signal often occurs in the form of noise and distortion.

A recent approach to noise reduction has been the use of beamforming using an array of microphones. This technique requires specialized hardware, such as multiple microphones, A/D converters, and other hardware, thus raising the cost of the system. Since the computational cost increases proportionally to the square of the number of microphones, that cost also can become prohibitive. Another limitation of microphone arrays is that some noise still leaks through the beamforming process. Moreover, actual array gains are usually much lower than those measured in anechoic conditions, or predicted from theory, because echoes and reverberation of interfering sound sources are still accepted through the mainlobe and sidelobes of the array.

The inventor has determined that it would be desirable to be able to enhance an acoustic signal without leaving out any part of the spectrum, introducing unnatural noise, or distorting the signal, and without the expense of microphone arrays. This invention provides a system and method for acoustic signal enhancement that avoids the limitations of prior techniques.

SUMMARY

This invention enhances the quality of an acoustic signal. An input signal may be processed to produce a corresponding output that has very low levels of noise ("signal" is used to mean a signal of interest; background and distracting sounds against which the signal is to be enhanced is referred to as "noise"). Enhancement may be accomplished by a signal model augmented by learning. The input signal may represent human speech, but it should be recognized that the enhancement may enhance any type of live or recorded acoustic data, such as musical instruments and bird or human singing.

The system enhances input signals by digitizing an input signal into binary data which is transformed to a time-frequency representation. Background noise is estimated and transient sounds are isolated. A signal detector is applied to the transients. Long transients without signal content and the background noise between the transients are included in the noise estimate. If at least some part of a transient contains signal of interest, the spectrum of the signal is compared to the signal model after rescaling, and the signal's parameters are fitted to the data. A low-noise signal is resynthesized using the best fitting set of signal model parameters. Since the signal model only incorporates low noise signal, the output signal also has low noise. The signal model is trained with low-noise signal data by creating templates from the spectrograms when they are significantly different from existing templates. If an existing template is found that resembles the input pattern, the template is averaged with the pattern in such a way that the resulting template is the average of all the spectra that matched that template in the past. The knowledge of signal characteristics thus incorporated in the model serves to constrict the reconstruction of the signal, thereby avoiding introduction of unnatural noise or distortions.

The system may output resynthesized signal data that is devoid of both impulsive and stationary noise. The system may use a single microphone as a source of input signals. Furthermore, the output signal in regions of low SNR is kept consistent with those spectra the source could generate.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DESCRIPTION OF DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
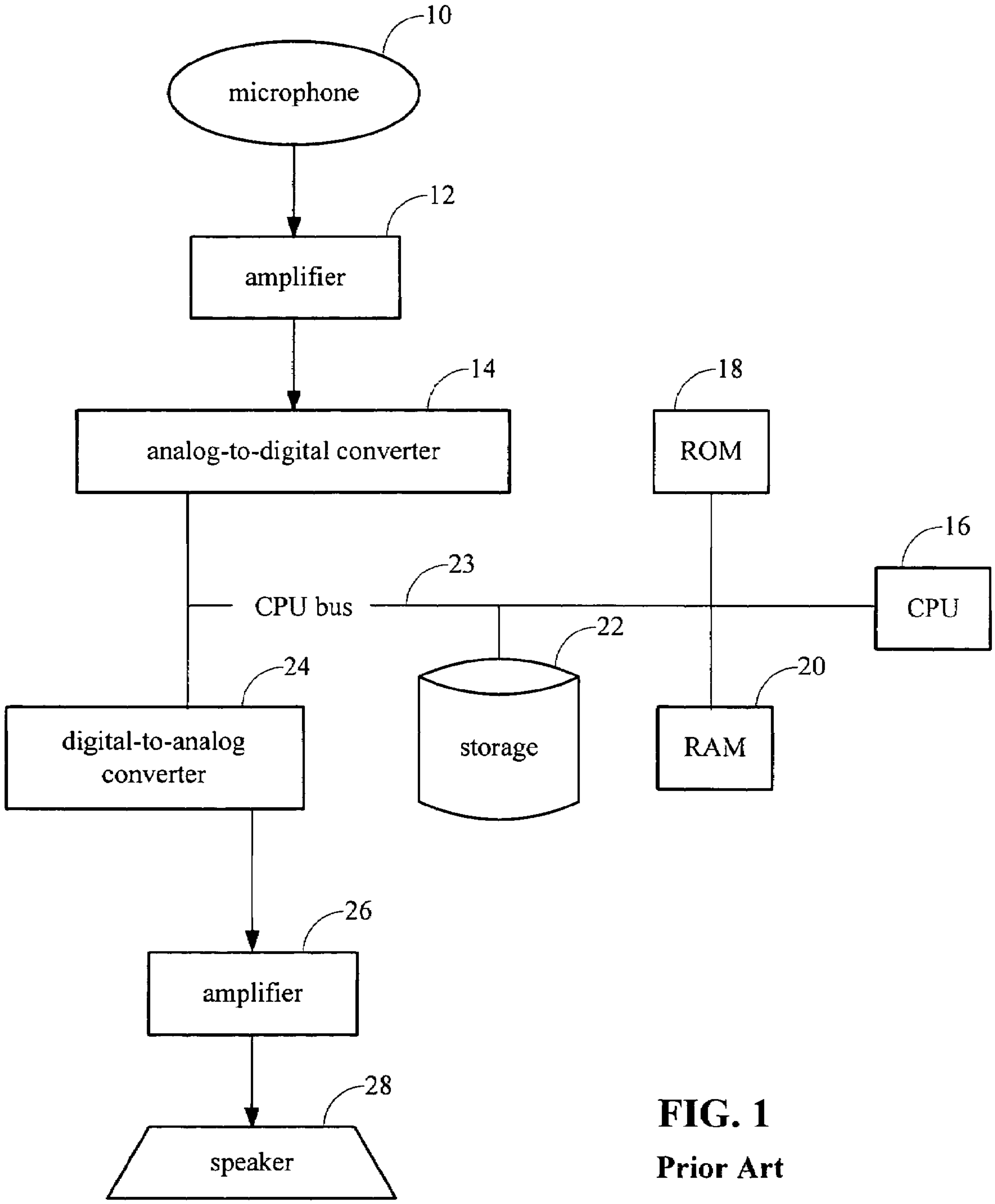
FIG. 1 Prior Art
FIG. 1 is block diagram of a prior art programmable computer system suitable for implementing signal enhancement techniques.

FIG. 1 shows a block diagram of a typical prior art programmable processing system which may be used for implementing the signal enhancement system. An acoustic signal is received at a transducer microphone 10, which generates a corresponding electrical signal representation of the acoustic signal. The signal from the transducer microphone 10 is then amplified by an amplifier 12 before being digitized by an analog-to-digital converter 14. The output of the analog-to-digital converter 14 is applied to a processing system which applies enhancement techniques. The processing system preferably includes a CPU 16, RAM 20, ROM 18 (which may be writable, such as a flash ROM), and an optional storage device 22, such as a magnetic disk, coupled by a CPU bus 23 as shown. The output of the enhancement process can be applied to other processing systems, such as an ASR system, or saved to a file, or played back for the benefit of a human listener. Playback is typically accomplished by converting the processed digital output stream into an analog signal by means of a digital-to-analog converter 24, and amplifying the analog signal with an output amplifier 26 which drives an audio speaker 28 (e.g., a loudspeaker, headphone, or earphone).

The following describes the functional components of an acoustic signal enhancement system. A first functional component is a dynamic background noise estimator that transforms input data to a time-frequency representation. The noise estimator provides a means of estimating continuous or slowly-varying background noise causing signal degradation. The noise estimator should also be able to adapt to a sudden change in noise levels, such as when a source of noise is activated (e.g., an air-conditioning system coming on or off). The dynamic background noise estimation function is capable of separating transient sounds from background noise, and estimate the background noise alone. In one implementation, a power detector acts in each of multiple frequency bands. Noise-only portions of the data are used to generate mean and standard-deviation of the noise in decibels (dB). When the power exceeds the mean by more than a specified number of standard deviations in a frequency band, the corresponding time period is flagged as containing signal and is not used to estimate the noise-only spectrum.

The dynamic background noise estimator works closely with a second functional component, a transient detector. A transient occurs when acoustic power rises and then falls again within a relatively short period of time. Transients can be speech utterances, but can also be transient noises, such as banging, door slamming, or other transient noises. Isolation of transients allows the transients to be studied separately and classified into signal and non-signal events. Also, it is useful to recognize when a rise in power level is permanent, such as when a new source of noise is turned on. This allows the system to adapt to that new noise level.

The third functional component is a signal detector. A signal detector is useful to discriminate non-signal non-stationary noise. In the case of harmonic sounds, it is also used to provide a pitch estimate if it is desired that a human listener listens to the reconstructed signal. The voice detector uses glottal pulse detection in the frequency domain. A spectrogram of the data is produced (temporal-frequency representation of the signal) and, after taking the logarithm of the spectrum, the signal is summed along the time axis up to a frequency threshold. A high autocorrelation of the resulting time series is indicative of voiced speech. The pitch of the voice is the lag for which the autocorrelation is maximum.

The fourth functional component is a spectral rescaler. The input signal can be weak or strong, close or far. Before measured spectra are matched against templates in a model, the measured spectra is rescaled so that the inter-pattern distance does not depend on the overall loudness of the signal. Weighting is proportional to the SNR in decibels (dB). The weights are bounded below and above by a minimum and a maximum value, respectively. The spectra are rescaled so that the weighted distance to each stored template is minimum.

The fifth functional component is a pattern matcher. The distance between templates and the measured spectrogram can be one of several appropriate metrics, such as the Euclidian distance or a weighted Euclidian distance. The template with the smallest distance to the measured spectrogram is selected as the best fitting prototype. The signal model includes prototypical spectrograms of short duration obtained from low-noise signal. Signal model training is accomplished by collecting spectrograms that are significantly different from prototypes previously collected. The first prototype is the first signal spectrogram containing signal significantly above the noise. For subsequent time epochs, if the spectrogram is closer to any existing prototype than a selected distance threshold, then the spectrogram is averaged with the closest prototype. If the spectrogram is farther away from any prototype than the selected threshold, then the spectrogram is declared to be a new prototype.

The sixth functional component is a low-noise spectrogram generator. A low-noise spectrogram is generated from a noisy spectrogram generated by the pattern matcher by replacing data in the low SNR spectrogram bins with the value of the best fitting prototype. In the high SNR spectrogram bins, the measured spectra are left unchanged. A blend of prototype and measured signal is used in the intermediate SNR cases.

The seventh functional component is a resynthesizer. An output signal is resynthesized from the low-noise spectrogram. A preferred embodiment proceeds as follows. The signal is divided into harmonic and non-harmonic parts. For the harmonic part, an arbitrary initial phase is selected for each component. Then, for each point of non-zero output, the amplitude of each component is interpolated from the spectrogram, and the fundamental frequency is interpolated from the output of the signal detector. Each component is synthesized separately, each with a continuous phase, amplitude, and an harmonic relationship between their frequencies. The output of the harmonic part is the sum of the components.

For the non-harmonic part of the signal, the fundamental frequency of the resynthesized time series does not need to track the signal's fundamental frequency. A continuous-amplitude and phase reconstruction may be performed as for the harmonic part, except that the fundamental frequency is held constant. In another embodiment, noise generators are used, one for each frequency band of the signal, and the amplitude tracks that of the low-noise spectrogram through interpolation. In yet another embodiment, constant amplitude windows of band-passed noise are added after their overall amplitude is adjusted to that of the spectrogram at that point.

Figure 2:
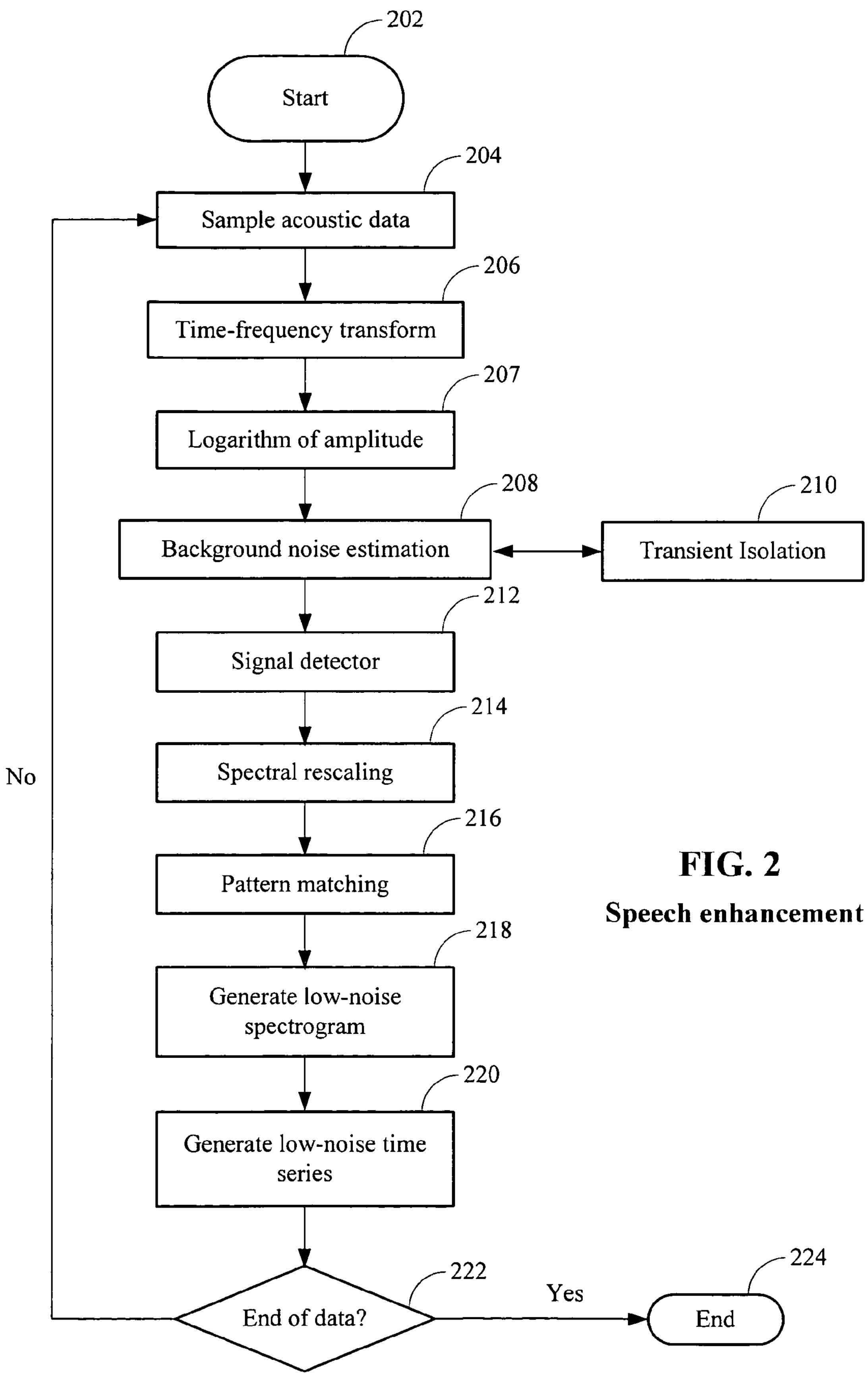
FIG. 2 is a flow diagram of a method for enhancing an acoustic signal.

FIG. 2 is a flow diagram of a method for enhancing an incoming acoustic signal, which consists of a plurality of data samples generated as output from the analog-to-digital converter 14 shown in FIG. 1. The method begins at a Start state (Step 202). The incoming data stream (e.g., a previously generated acoustic data file or a digitized live acoustic signal) is read into a computer memory as a set of samples (Step 204). The signal enhancement may be applied to enhance a "moving window" of data representing portions of a continuous acoustic data stream, such that the entire data stream is processed. Generally, an acoustic data stream to be enhanced is represented as a series of data "buffers" of fixed length, regardless of the duration of the original acoustic data stream.

The samples of a current window are subjected to a time-frequency transformation, which may include appropriate conditioning operations, such as pre-filtering, shading, or other conditioning operations. (Step 206). Any of several time-frequency transformations can be used, such as the short-time Fourier transform, bank of filter analysis, discrete wavelet transform, or other transformations.

The result of the time-frequency transformation is that the initial time series x(t) is transformed into a time-frequency representation X(f, i), where t is the sampling index to the time series x, and f and i are discrete variables respectively indexing the frequency and time dimensions of spectrogram X. In the preferred embodiment, the logarithm of the magnitude of X is used instead of X (Step 207) in subsequent steps unless specified otherwise, i.e.:

$$P(f,i)=20\log_{10}(|X(f,i)|).$$

The power level P(f, i) as a function of time and frequency will be referred to as a "spectrogram".

The power levels in individual bands f are then subjected to background noise estimation (Step 208) coupled with transient isolation (Step 210). Transient isolation detects the presence of transient signals buried in stationary noise and outputs estimated starting and ending times for such transients. Transients can be instances of the sought signal, but can also be impulsive noise. The background noise estimation updates the estimate of the background noise parameters between transients.

A preferred embodiment for performing background noise estimation comprises a power detector that averages the acoustic power in a sliding window for each frequency band f. When the power within a predetermined number of frequency bands exceeds a threshold determined as a certain number of standard deviation above the background noise, the power detector declares the presence of a signal, i.e., when:

$$P(f,i)>B(f)+c\sigma(f),$$

where B(f) is the mean background noise power in band f, σ(f) is the standard deviation of the noise in that same band, and c is a constant. Alternatively, noise estimation need not be dynamic, but may be measured once (for example, during boot-up of a computer running software implementing the signal enhancement).

The transformed data that is passed through the transient detector is then applied to a signal detector function (Step 212). This step allows the system to discriminate against transient noises that are not of the same class as the signal. For speech enhancement, a voice detector is applied at this step. In particular, in the preferred voice detector, the level P(f, i) is summed along the time axis between a minimum and a maximum frequency lowf and topf, $$b(i)=\sum_{f=lowf}^{topf}P(f,i)$$

respectively.

Next, the autocorrelation of b(i) is calculated as a function of the time lag τ, for $\tau_{maxpitch}\leqq\tau\leqq\tau_{minipitch}$, where $\tau_{maxpitch}$ is the lag corresponding to the maximum voice pitch allowed, while $\tau_{minipitch}$ is the lag corresponding to the minimum voice pitch allowed. The statistic on which the voice/unvoiced decision is based is the value of the normalized autocorrelation (autocorrelation coefficient) of b(i), calculated in a window centered at time period i. If the maximum normalized autocorrelation is greater than a threshold, it is deemed to contain voice. This method exploits the pulsing nature of the human voice, characterized by glottal pulses appearing in the short-time spectrogram. Those glottal pulses line up along the frequency dimension of the spectrogram. If the voice dominates at least some region of the frequency domain, then the autocorrelation of the sum will exhibit a maximum at the value of the pitch period corresponding to the voice. The advantage of this voice detection method is that it is robust to noise interference over large portions of the spectrum, since it works with good SNR over a portion of the spectrum for the autocorrelation coefficient of b(i) to be high.

Another embodiment of the voice detector weights the spectrogram elements before summing them in order to decrease the contribution of the frequency bins with low SNR, i.e.:

$$b(i)=\sum_{f=lowf}^{topf}P(f,i)w'(f,i).$$

The weights w(i) are proportional to the SNR r(f, i) in band fat time i, calculated as a difference of levels, i.e. r(f, i)=P(f, i)−B(f) for each frequency band. In this embodiment, each element of the resealing factor is weighted by a weight defined as follows, where $w_{min}$ and $w_{max}$ are preset thresholds:

$$w(f,i)=w_{min} \text{ if } r(f,i)<w_{min};$$

$$w(f,i)=w_{max} \text{ if } r(f,i)>w_{max};$$

$$w(f,i)=r(f,i) \text{ otherwise,}$$

The weights may be normalized by the sum of the weights at each time frame, i.e.:

$$w'(f,i)=w(f,i)/\text{sum}_f(w(f,i)),$$

$$w'_{min}=w_{min}/\text{sum}_f(w(f,i)),$$

$$w'_{max}=w_{max}/\text{sum}(w(f,i)).$$

The spectrograms P from Steps 208 and 210 are preferably then rescaled so that they can be compared to stored templates (Step 214). One method of performing this step is to shift each element of the spectrogram P(f, i) up by a constant k(i, m) so that the root-mean-squared difference between P(f, i)+k(i, m) and the $m^{th}$ template T(f, m) is minimized. This is accomplished by taking the following, where N is the number of frequency bands:

$$k(i, m) = \frac{1}{N}\sum_{f=1}^{N}[P(f, i) - T(f, m)]$$

Alternatively weighting is used in the resealing of the templates prior to comparison:

$$k(i, m) = \frac{1}{N}\sum_{f=1}^{N}[P(f, i) - T(f, m)]w'(f, i)$$

The effect of such rescaling is to align preferentially the frequency bands of the templates having a higher SNR. However, resealing is optional.

Alternatively, the SNR of the templates may be used as well as the SNR of the measured spectra for the resealing of the templates. The SNR of template T(f, m) is defined as $r_N(f, m)=T(f, m)-B_N(f)$, where $B_N(f)$ is the background noise in frequency band f at the time of training. A weighting scheme using both r and $r_N$ may define the weights $w_N$ as the square-root of the product of the weights for the templates and the spectrogram:

$$w_2(f,i,m)=w_{min} \text{ if } \sqrt{r_N(f,m)r(f,i)}<w_{min};$$

$$w_2(f,i,m)=w_{max} \text{ if } \sqrt{r_N(f,m)r(f,i)}>w_{max};$$

$$w_2(f,i,m)=\sqrt{r_N(f,m)r(f,i)}>w_{max} \text{ otherwise.}$$

Other combinations of $r_N$ and r are admissible. The weights may be normalized by the sum of the weights at each time frame, i.e.:

$$w'_2(f,i)=w_2(f,i)/\text{sum}_f(w_2(f,i)),$$

$$w'_{min}=w_{min}/\text{sum}_f(w_2(f,i)),$$

$$w'_{max}=w_{max}/\text{sum}_f(w_2(f,i)).$$

After spectral rescaling, pattern matching finds a template T* in the signal model that best matches the current spectrogram P(f, i) (Step 216). There exists some latitude in the definition of the term "best match", as well as in the method used to find that best match. The template with the smallest r.m.s. (root mean square) difference d* between P+k and T* may be found. Alternatively, the weighted r.m.s. distance may be used, where:

$$d(i, m) = \frac{1}{N}\sum_{f=1}^{N}[P(f, i) + k(i, m) - T(f, m)]^2 w'_2(f, i, m)$$

Here, the frequency bands with the least SNR contribute less to the distance calculation than those bands with more SNR. The best matching template T*(i) at time i is selected by finding m such that $d^*(i)=\min_m(d(i,m))$.

Next, a low-noise spectrogram C is generated by merging the selected closest template T* with the measured spectrogram P (Step 218). For each window position i, a low-noise spectrogram C is reconstructed from P and T*. In the preferred embodiment, the reconstruction takes place the following way. For each time-frequency bin:

$$C(f,i)=w'_2(f,i)P(f,i)+[w'_{max}-w'_2(f,i)]T^*(f,i).$$

After generating a low-noise spectrogram C, a low-noise output time series y is synthesized (Step 220). In the preferred embodiment, the spectrogram is divided into harmonic ($y_h$) and non-harmonic ($y_u$) parts and each part is reconstructed separately (i.e., $y=y_h+y_u$). The harmonic part is synthesized using a series of harmonics c(t, j). An arbitrary initial phase $\phi_0(j)$ is selected for each component j. Then for each output point $y_h(t)$ the amplitude of each component is interpolated from the spectrogram C, and the fundamental frequency $f_0$ is interpolated from the output of the voice detector. The components c(t, j) are synthesized separately, each with a continuous phase, amplitude, and a common pitch relationship with the other components:

$$c(t,j)=A(t,j)\sin\,[f_0 j\, t+\phi_0(j)],$$

where A(t, j) is the amplitude of each harmonic j at time t. Spline interpolation may generate continuous values of $f_0$ and A(t, j) that vary smoothly between spectrogram points.

The harmonic part of the output is the sum of the components, $y_h(t)=\text{sum}_j[c(t,j)]$. For the non-harmonic part of the signal $y_u$, the fundamental frequency does not need to track the signal's fundamental frequency. In one embodiment, a continuous-amplitude and phase reconstruction is performed as for the harmonic part, except that $f_0$ is held constant. In another embodiment, a noise generator is used, one for each frequency band of the signal, and the amplitude is made to track that of the low-noise spectrogram.

If any of the input data remains to be processed (Step 222), then the entire process is repeated on a next sample of acoustic data (Step 204). Otherwise, processing ends (Step 224). The final output is a low-noise signal that represents an enhancement of the quality of the original input acoustic signal.

Figure 3:
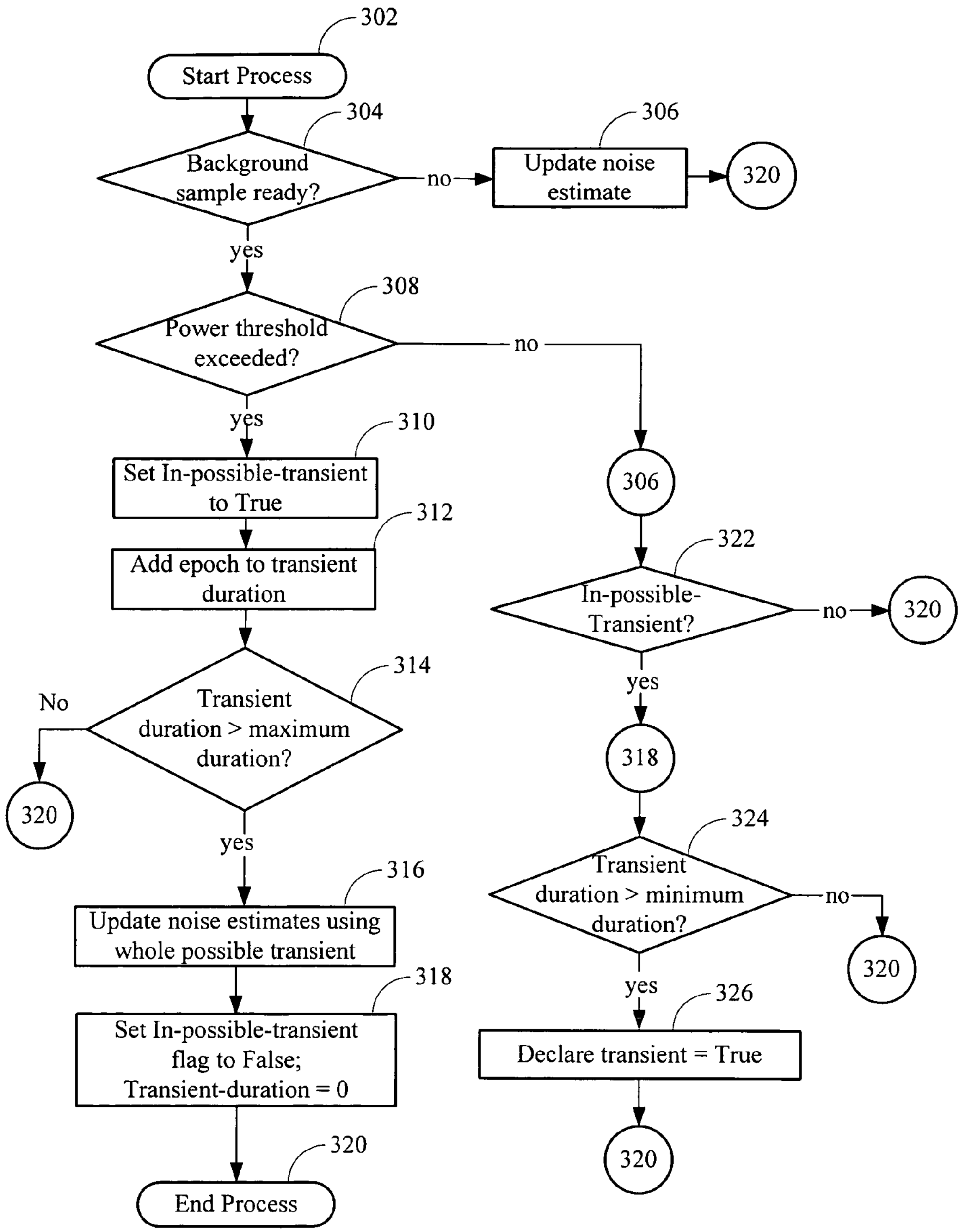
FIG. 3 is a flow diagram showing a method for detecting and isolating transients in input data and estimating background noise parameters.

FIG. 3 is a flow diagram providing a more detailed description of the process of background noise estimation and transient detection which were briefly described as Steps 212 and 208, respectively, in FIG. 2. The transient isolation process detects the presence of transient signal buried in stationary noise. The background noise estimator updates the estimates of the background noise parameters between transients.

The process begins at a Start Process state (Step 302). The process obtains a sufficient number of samples of background noise for determining the mean and standard deviation of the noise to detect transients. Accordingly, the routine determines if a sufficient number of samples of background noise have been obtained (Step 304). If not, the present sample is used to update the noise estimate (Step 306) and the process is terminated (Step 320). In one embodiment of the background noise update process, the spectrogram elements P(f, i) are kept in a ring buffer and are used to update the mean B(f) and the standard deviation σ(f) of the noise in each frequency band f. The background noise estimate is considered ready when the index i is greater than a preset threshold.

If the background samples are ready (Step 304), then a determination is made as to whether the signal level P(f, i) is significantly above the background in some of the frequency bands (Step 308). In a preferred embodiment, when the power within a predetermined number of frequency bands is greater than a threshold determined as a certain number of standard deviations above the background noise mean level, the determination step indicates that the power threshold has been exceeded, i.e., when $$P(f,i)>B(f)+c\sigma(f),$$

where c is a constant predetermined empirically. Processing then continues at Step 310.

In order to determine if the spectrogram P(f, i) contains a transient signal, a flag "In-possible-transient" is set to True (Step 310), and the duration of the possible transient is incremented (Step 312). A determination is made as to whether the possible transient is too long to be a transient or not (Step 314). If the possible transient duration is still within the maximum duration, then the process is terminated (Step 320). On the other hand, if the transient duration is judged too long to be a spoken utterance, then it is deemed to be an increase in background noise level. Hence, the noise estimate is updated retroactively (Step 316), the "In-possible-transient" flag is set to False and the transient-duration is reset to 0 (Step 318), and processing terminates (Step 320).

If a sufficiently powerful signal is not detected in Step 308, then the background noise statistics are updated as in Step 306. After that, the "In-possible-transient" flag is tested (Step 322). If the flag it is set to False, then the process ends (Step 320). If the flag is set to True, then it is reset to False and the transient-duration is reset to 0, as in Step 318. The transient is then tested for duration (Step 324). If the transient is deemed too short to be part of a speech utterance, the process ends (Step 320). If the transient is long enough to be a possible speech utterance, then the transient flag is set to True, and the beginning and end of the transient are passed up to the calling routine (Step 326). The process then ends (Step 320).

Figure 4:
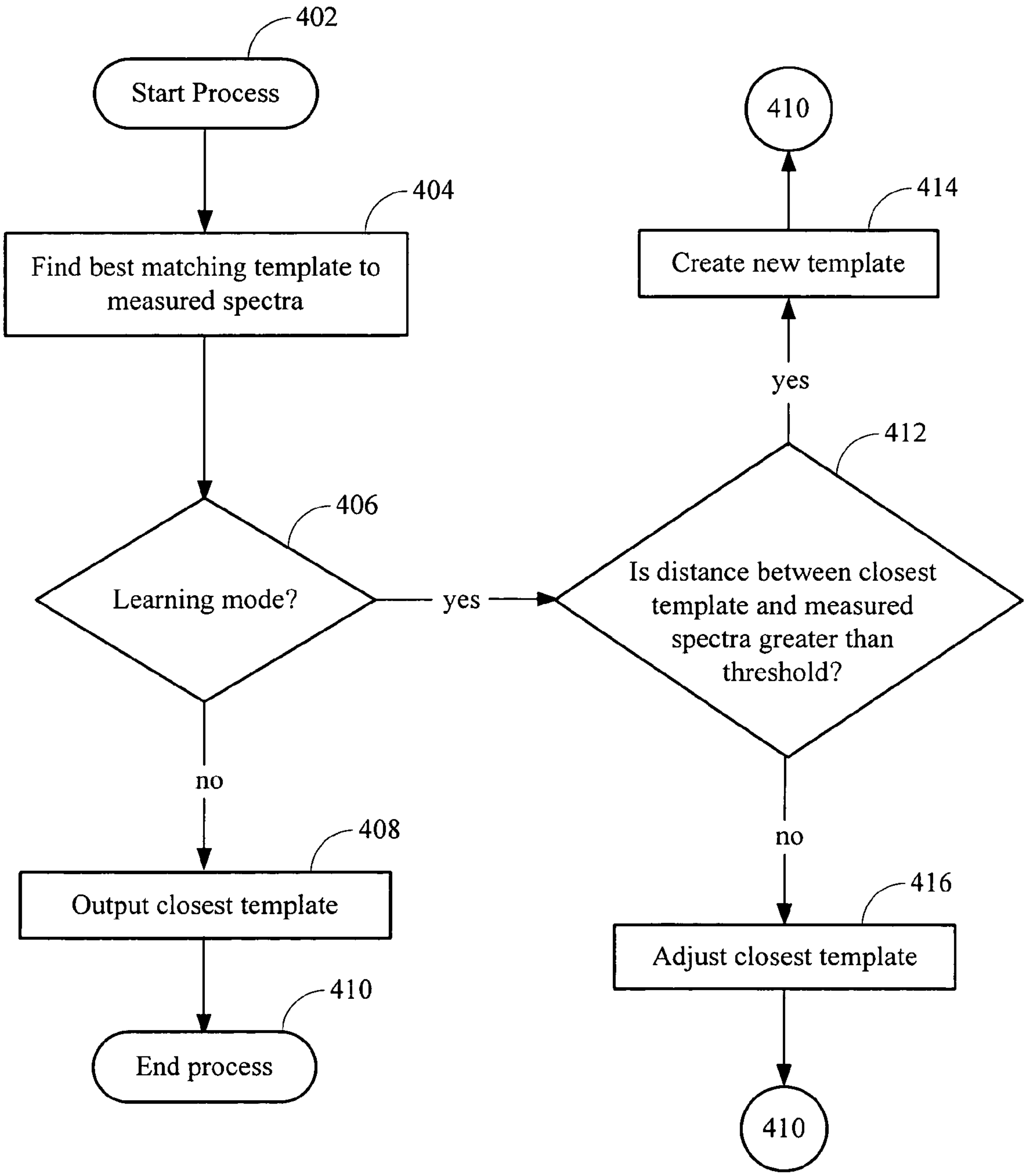
FIG. 4 is a flow diagram showing a method for generating and using the signal model templates.

FIG. 4 is a flow diagram providing a more detailed description of the process of pattern matching which was briefly described as Step 216 of FIG. 2. The process begins at a Start Process state (Step 402). The pattern matching process finds a template T* in the signal model that best matches the considered spectrogram P(f, i) (Step 404). The pattern matching process is also responsible for the learning process of the signal model. There exists some latitude in the definition of the term "best match", as well as in the method used to find that best match. In one embodiment, the template with the smallest r.m.s. difference d* between P+k and T* is found. In the preferred embodiment, the weighted r.m.s. distance is used to measure the degree of match. In one embodiment, the r.m.s. distance is calculated by:

$$d(i,m)=\frac{1}{N}\sum_{f=1}^{N}[P(f,i)+k(i,m)-T(f,m)]^2 w_2'(f,i,m)$$

Here, the frequency bands with the least SNR contribute less to the distance calculation than those bands with more SNR. The best matching template T*(f, i) that is the output of Step 404 at time i is selected by finding m such that $d^*(i)=\min_m[d(i,m)]$. If the system is not in learning mode (Step 406), then T*(f, i) is also the output of the process as being the closest template (Step 408). The process then ends (Step 410).

If the system is in learning mode (Step 406), the template T*(f, i) most similar to P(f, i) is used to adjust the signal model. The manner in which T*(f, i) is incorporated in the model depends on the value of d*(i) (Step 412). If $d^*(i)<d_{max}$, where $d_{max}$ is a predetermined threshold, then T*(f, i) is adjusted (Step 416), and the process ends (Step 410). Step 416 is implemented such that T*(f, i) is the average of all spectra P(f, i) that are used to compose T*(f, i). The number $n_m$, of spectra associated with T(f, m) is kept in memory, and when a new spectrum P(f, i) is used to adjust T(f, m), the adjusted template is:

$$T(f,m)=[n_m T(f,m)+P(f,i)]/(n_m+1),$$

and the number of patterns corresponding to template m is adjusted as well:

$$n=n_m+1.$$

Going back to Step 412, if $d^*(i)>d_{max}$, then a new template is created (Step 414), T*(f, i)=P(f, i), with a weight $n_m=1$, and the process ends (Step 410).

The signal enhancement techniques may be implemented in hardware or software, or a combination of both (e.g., in programmable logic arrays). The algorithms are not limited to any particular computer or other hardware. A general purpose or a specialized machine may implement the signal enhancement techniques. The signal enhancement techniques may be implemented in one or more computer programs executing on programmable systems each comprising a processor and a data storage system (e.g., including volatile and non-volatile memory and/or storage elements), an input device, and an output device. The programs may be implemented in any desired computer language (including machine, assembly, high level procedural, or object oriented programming languages). The language may be a compiled or interpreted language.

The programs may be stored on a storage media or device (e.g., ROM, CD-ROM, or other magnetic or optical media) readable by a general or special purpose programmable computer, for configuring and operating the computer when the storage media or device is read by the computer to perform the procedures described herein. The signal enhancement techniques may also be implemented as a computer-readable storage medium, configured with a computer program, where the storage medium causes a computer to operate in a specific and predefined manner to perform the signal enhancements.

While various embodiments of the invention have been described, it will be apparent to those of ordinary skill in the art that many more embodiments and implementations are possible within the scope of the invention. For example, some of the steps of various of the algorithms may be order independent, and thus may be executed in an order other than as described above. Accordingly, the invention is not to be restricted except in light of the attached claims and their equivalents.

What is claimed is:

1. A method for enhancing an input signal, the method comprising:

determining a time-frequency representation of a noisy input signal;

estimating a background noise level and a signal-to-noise ratio;

determining a matching low noise signal template for the time-frequency representation; and replacing a portion of the time-frequency representation with a mix of the time-frequency representation and the matching low noise signal template, the mix weighted by the signal-to-noise ratio.

2. The method of claim 1, where determining comprises: determining a matching low noise spectrogram.

3. The method of claim 1, where determining comprises: determining a smallest root mean square difference between the time-frequency representation and multiple low noise signal templates, including the matching low noise signal template, in a signal model.

4. The method of claim 3, where the multiple low noise signal templates comprise low noise spectrograms.

5. The method of claim 1, further comprising:

collecting multiple low noise signal templates, including the matching low noise signal template, into a signal model.

6. The method of claim 5, further comprising:

training the signal model.

7. The method of claim 6, further comprising:

determining whether a learning mode is active or inactive; and where replacing further comprises:

replacing a portion of the digitized input signal with a signal-to-noise ratio weighted mix of the time-frequency representation and the matching low noise signal template, when the learning mode is inactive.

8. The method of claim 7, where training comprises:

updating the matching low noise signal template with the time-frequency representation, when the learning mode is active.

9. The method of claim 7, where training comprises:

adding the time-frequency representation as a new low noise signal template into the signal model, when the learning mode is active.

10. A system for enhancing an input signal, the system comprising:

means for transforming the input signal to a time-frequency representation;

means for determining a matching low noise signal template for the time-frequency representation; and means for replacing a portion of the time-frequency representation with a signal-to-noise ratio weighted mix of the time-frequency representation and the matching low noise signal template.

11. The system of claim 10, further comprising:

means for estimating a background noise level and a signal-to-noise ratio.

12. The system of claim 10, further comprising:

means for detecting a speech utterance in the input signal, and where the portion is the speech utterance.

13. The system of claim 10, further comprising:

means for training a signal model comprising the matching low noise signal template by updating the matching low noise signal template or adding a new low noise signal template comprising the time-frequency representation.

14. A signal enhancement system comprising:

a processor;

memory coupled to the processor, the memory comprising instructions which cause the processor to:

establish a signal model comprising multiple low noise signal templates;

obtain an input signal;

determine a matching low noise signal template in the signal model for the input signal; and replace a portion of the input signal with a signal-to-noise ratio weighted mix of the input signal and the matching low noise signal template.

15. The system of claim 14, where the memory further comprises instructions which cause the processor to:

determine an input signal spectrogram of the input signal; where:

the instructions which cause the processor to determine a matching low noise signal template cause the processor to determine a matching low noise spectrogram template; and where:

the instructions which cause the processor to replace a portion of the input signal cause the processor to generate a low noise spectrogram by replacing a portion of the input signal spectrogram with a signal-to-noise ratio weighted mix of the input signal spectrum and the matching low noise spectrogram template.

16. The system of claim 15, where the memory further comprises instructions which cause the processor to:

synthesize a low noise output time series from the low noise spectrogram.

17. The system of claim 14, where the instructions which cause the processor to determine a matching low noise signal template cause the processor to:

determine a signal-to-noise ratio weighted distance between the input signal and each of the low noise signal templates, whereby frequency bands in the input signal contribute to the signal-to-noise ratio weighted distance in proportion to their signal-to-noise ratios.

18. The system of claim 14, where the memory further comprises instructions which cause the processor to train the signal model.

19. The system of claim 18, where the instructions which cause the processor to train the signal model comprise instructions which cause the processor to update at least one of the low noise signal templates in the signal model.

20. The system of claim 18, where the instructions which cause the processor to train the signal model comprise instructions which cause the processor to add the input signal as a new low noise signal template to the signal model.

21. A product comprising:

a computer readable medium; and instructions on the computer readable medium which cause a processor to:

determine a matching low noise signal template for a noisy input signal from a signal model comprising multiple low noise signal templates; and replace a portion of the input signal with a signal-to-noise ratio weighted mix of the input signal and the matching low noise signal template.

22. The product of claim 21, where the instructions further cause the processor to:

determine an input signal spectrogram of the noisy input signal; and where the instructions which determine a matching low noise signal template cause the processor to:

determine a signal-to-noise ratio weighted distance between the input signal spectrogram and each of the low noise signal templates; and select, as the matching low noise signal template, the multiple low noise signal template in the signal model with the smallest signal-to-noise ratio weighted distance, whereby frequency bands in the noisy input signal contribute to the signal-to-noise ratio weighted distance in proportion to their signal-to-noise ratios.

23. The product of claim 21, where the medium further stores instructions which cause the processor to:

detect a transient in the noisy input signal prior to determining the matching low noise signal template.

24. The product of claim 23, where the transient is a voice transient.

25. The product of claim 21, where the medium further stores instructions which cause the processor to:

search for a transient in the noisy input signal;

update a background noise estimate when the transient is not present; and determine the matching low noise signal template and replace the portion of the input signal upon detection of the transient.

* * * * *